United States Patent [19]

Austin et al.

[11] 4,149,866

[45] Apr. 17, 1979

[54] METHOD FOR FORMING BASALT FIBERS WITH IMPROVED TENSILE STRENGTH

[75] Inventors: Helen F. Austin; Ravanasamudram V. Subramanian, both of Pullman, Wash.

[73] Assignee: Washington State University Research Foundation, Pullman, Wash.

[21] Appl. No.: 884,899

[22] Filed: Mar. 9, 1978

[51] Int. Cl.² ............................................. C03B 37/02
[52] U.S. Cl. ............................................ 65/2; 65/32
[58] Field of Search ................................ 65/1, 2, 32

[56] References Cited

U.S. PATENT DOCUMENTS

| | | | |
|---|---|---|---|
| 1,108,007 | 8/1914 | Ribbe | 106/41 |
| 1,438,428 | 12/1922 | Dhe | 65/2 |
| 1,893,382 | 1/1933 | Watson | 65/32 |
| 3,066,504 | 12/1962 | Hartwig | 65/32 X |
| 3,557,575 | 1/1971 | Beall | 65/33 |
| 3,679,443 | 7/1972 | Mechel et al. | 65/2 X |
| 3,929,497 | 12/1975 | Clark-Monks | 106/50 |
| 4,008,094 | 2/1977 | Beall et al. | 106/99 |

FOREIGN PATENT DOCUMENTS 536236  5/1941  United Kingdom ........................ 65/2

OTHER PUBLICATIONS

Sprechsaal Fur Keramik—Glas—Email, (1958).
Mineral Fiber from Basalt—Potential New U.S. Industry, R.A.V. Raff E&MJ, 2-1974.
Basalt Glass Ceramics, Beall et al., A.C.S. Bulletin, vol. 55(6), pp. 579-582, (1976).
Equilibrium Between Volatiles and Iron Oxides in Igneous Rocks, Geo. Kennedy, Amer. Jour. of Sci., 9-1948, pp. 529-549.

*Primary Examiner*—Robert L. Lindsay, Jr.
*Attorney, Agent, or Firm*—Wells, St. John & Roberts

[57] ABSTRACT

A method of improving the tensile strength of drawn fibers produced from molten basalt rock. Strength is increased by reducing the ferric iron content of the final fibers below that which would be present in the fibers if drawn under normal atmospheric and operational conditions. This is accomplished by either adding a reducing agent to the melt, by drawing the fibers in an inert or reducing atmosphere, or by a combination of both methods.

4 Claims, No Drawings

METHOD FOR FORMING BASALT FIBERS WITH IMPROVED TENSILE STRENGTH

BACKGROUND OF THE INVENTION

This invention relates to the production of fibers from basalt rock. The general technology necessary to produce such fibers is known, and utilizes available equipment and processes. A discussion of basalt, including a review of its chemical composition, microstructure, and physical characteristics, is provided in U.S. Pat. No. 3,557,575, which is hereby incorporated into this disclosure by reference. Similarly, a detailed discussion of the manner by which basalt can be drawn as fibers is provided in U.S. Pat. No. 4,008,094, which also is incorporated by reference. An apparatus for producing fibers of ceramic materials is disclosed in U.S. Pat. No. 3,066,504, which is further incorporated by reference.

The general technology for drawing fibers from basalt is well known and recognized in the literature. A review of this literature is set out in an article titled "Mineral Fiber from Basalt—Potential New U.S. Industry?" by R. A. V. Raff in the periodical *Engineering and Mining Journal* published in February, 1974. The present disclosure relates to the discovery of an improved process by which the tensile strength of such fibers can be increased beyond those values expected in the use of the prior art processes.

DESCRIPTION OF THE PREFERRED EMBODIMENTS

Basalt rock contains compounds of iron, including substantial components of both ferrous oxide, FeO and ferric oxide, $Fe_2O_3$. Typical samples of basalt rock contain about two percent of ferric oxide and nine to twelve percent of ferrous oxide. However, when the basalt rock is melted under normal process conditions in an electric furnace and subsequently drawn through a platinum die, substantial portions of the ferrous oxide are oxidized to produce an increase in the ratio of ferric oxide to ferrous oxide over that ratio which is present in the initial rock. We have found that by controlling this rate of oxidation so as to minimize the ratio of ferric oxide to ferrous oxide in the resulting fibers (or conversely, to increase the ratio of ferrous oxide to ferric oxide) the resulting fiber will demonstrate desirable increased tensile strength.

The improvement in tensile strength in the fiber may be accomplished in several different ways. Reduction of ferric iron as it is formed can be accomplished in an induction furnace by adding sugar, graphite or other carbon sources to the melt. Carbon can also be introduced by utilizing a graphite crucible or a crucible having a graphite lining as the vessel in which heat is used to melt the pellets of basalt rock. The carbon source materials in the melt form carbon monoxide or carbon dioxide when heated. Both substances are gaseous, and either reducing or inert agents are mixed intimately with the melt to provide the reducing or inert atmosphere necessary to counter normal oxidation of the ferrous iron components.

During production of the fibers, it is normal that additional oxidation of the ferrous compounds present in the melt occurs. Prevention or reduction of this oxidation by use of an inert atmosphere such as nitrogen, or a reducing atmosphere, such as carbon monoxide, allows fibers of greatly increased strength to be prepared.

EXAMPLE 1

A sample of basalt rock having an initial content of 2.1% ferric oxide and 11.5% ferrous oxide was melted under normal ceramic conditions and drawn to produce fibers of identical diameter, the fibers being drawn under air and under a nitrogen atmosphere, which was utilized to prevent oxidation of the ferrous iron. These tests were repeated several times and are summarized in the following table 1. Samples 1 and 2 were drawn under air, allowing oxidation of the ferrous iron without control. Sample 3 was drawn under a nitrogen atmosphere to prevent oxidation of the ferrous iron. The substantial improvements in tensile strength are readily observable.

TABLE 1

| Sample | % FeO | % $Fe_2O_3$ | Temp. of Drawing °C. | Tensile Strength GPa | psi |
|---|---|---|---|---|---|
| 1 | 5.7 | 8.5 | 1250° | 1.72 | 249,000 |
|  |  |  | 1325° | 1.93 | 280,000 |
|  |  |  | 1370° | 2.09 | 303,000 |
| 2 | 7.1 | 7.0 | 1250° | 2.14 | 310,000 |
|  | 6.8 | 7.3 | 1325° | 2.42 | 350,000 |
| 3 | 9.8 | 4.0 | 1250° | 2.84 | 412,000 |
|  | 9.5 | 4.3 | 1325° | 3.07 | 445,000 |
|  | 9.2 | 4.7 | 1370° | 3.17 | 460,000 |

EXAMPLE 2

Tests have shown that the amount of ferrous iron in the final drawn fibers can be increased by placing a carbon rod in the molten basalt during the fiber forming operation, or by adding two percent starch to the melt. Taking a typical basalt fiber formed in air, the resulting percentage of ferrous oxide in the fiber was measured at 5.7%. A fiber formed by the identical process with the addition of 2% starch to the melt was found to have a ferrous oxide content of 8.5%. A fiber formed by the identical process, but having a carbon rod placed in the melt was found to have a ferrous oxide content of 10.7%. Our experiments show that the tensile strength of the resulting fibers increases with an increase in the percentage of the ferrous oxide content in the fiber.

EXAMPLE 3

Basalt fibers were made from four additional basalts, each showing an increase in tensile strength with an increase in the percentage of ferrous iron. The chemical analysis of the basalts are as follows:

TABLE 2

|  | X-6 | K-9048 | K-9017 | O-2 |
|---|---|---|---|---|
| $SiO_2$ | 49.10 | 50.48 | 53.61 | 50.50 |
| $Al_2O_3$ | 13.80 | 5.18 | 5.14 | 16.00 |
| $TiO_2$ | 3.16 | 1.69 | 1.84 | 2.17 |
| $Fe_2O_3$ | 2.10 | 3.20 | 3.31 | 2.96 |
| FeO | 11.50 | 7.51 | 8.34 | 10.22 |
| MnO | 0.21 | 0.19 | 0.18 | — |
| CaO | 9.43 | 10.62 | 8.43 | 10.00 |
| MgO | 5.25 | 6.49 | 4.98 | 4.30 |
| $K_2O$ | 1.26 | 0.80 | 1.14 | 0.35 |
| ($Na_2$) | 3.09 | 2.62 | 2.73 | 3.20 |
| $P_2O_5$ | 0.68 | 0.33 | 0.35 |  |

The above basalts were melted and drawn with varying ratios of ferrous oxide to ferric oxide in the final fibers as reported in the following table.

TABLE 3

| | % FeO | % Fe₂O₃ | Temp. | Tensile Strength GPa | Tensile Strength psi |
|---|---|---|---|---|---|
| X-6 | 9.1 | 5.2 | 1300° | 3.22 | 467,000 |
| | 8.3 | 6.1 | 1300 | 2.98 | 432,000 |
| | 6.8 | 7.3 | 1325 | 2.42 | 350,000 |
| | 5.7 | 8.5 | 1325 | 1.93 | 280,000 |
| K-9048 | 6.5 | 4.6 | 1300° | 3.11 | 450,000 |
| | 5.5 | 5.4 | 1300 | 2.40 | 348,000 |
| K-9017 | 7.8 | 3.9 | 1350 | 3.16 | 458,000 |
| | 7.3 | 4.5 | .350 | 2.06 | 298,000 |
| O-2 | 8.6 | 4.6 | 1300° | 3.13 | 454,000 |
| | 5.5 | 8.1 | 1300 | 2.40 | 347,000 |

As can be seen in Table 3, the resulting tensile strength of the fibers increases with an increase in its ferrous oxide content.

This discovery of a method of producing fibers of greater tensile strength than expected from basalt rock is believed to possibly open new industrial applications to a readily available raw product.

In general, staple fibers from available minerals have substantial industrial values if their mechanical properties are adequate. Basalt is basically an inexhaustible natural resource. Only electric power is required to melt and draw the fiber and such processes are ecologically nonpolluting. This method is believed to be capable of extending the use of basalt fibers into reinforcing applications where these fibers have not found acceptance because of tensile strength limitations.

Having described our invention, we claim:

1. A process of increasing the tensile strength properties of basalt fibers produced from natural basalt rock containing both ferrous oxide and ferric oxide, comprising:
   heating the basalt rock above its melting point while adding a reducing agent to the melt;
   and drawing the molten basalt rock through a small diameter die to form fibers;
   whereby oxidation of the ferrous oxide content of the basalt is minimized during the melting step and the tensile strength of the drawn fibers is increased.

2. A process as set out in claim 1 wherein the addition of a reducing agent to the melt is accomplished by melting the basalt rock in a vessel of graphite or a vessel having a graphite lining.

3. A process as set out in claim 1 wherein the addition of the reducing agent is accomplished by adding a carbon source, such as sugar, to the basalt rock as it is melted.

4. A process of increasing the tensile strength properties of basalt fibers produced from natural basalt rock containing both ferrous oxide and ferric oxide, comprising:
   heating the basalt rock above its melting point;
   and drawing the molten basalt rock through a small diameter die to form fibers while maintaining the molten basalt rock and die within an inert or reducing atmosphere, whereby the molten basalt rock is drawn as fibers while minimizing oxidation of its ferrous oxide content and increasing its resulting tensile strength.

* * * * *